United States Patent [19]

Bruner

[11] 4,381,854

[45] May 3, 1983

[54] GUIDE BAR FOR CUTTING TORCH

[76] Inventor: Harry E. Bruner, 27 Meadow La., Apt. #5, Bridgewater, Mass. 02324

[21] Appl. No.: 244,147

[22] Filed: Mar. 16, 1981

Related U.S. Application Data

[63] Continuation-in-part of Ser. No. 120,713, Feb. 11, 1980, abandoned.

[51] Int. Cl.³ .............................................. B23K 7/04
[52] U.S. Cl. ...................................... 266/54; 266/58; 266/64; 266/66
[58] Field of Search ........................ 266/54, 55, 56, 58, 266/59, 64, 66, 71, 77

[56] References Cited

U.S. PATENT DOCUMENTS

| | | | |
|---|---|---|---|
| 2,705,629 | 4/1955 | Miller | 266/56 |
| 2,813,710 | 11/1957 | Angle | 266/58 |
| 3,417,979 | 12/1968 | Cable et al. | 266/64 |
| 3,450,398 | 6/1969 | Barnes et al. | 266/71 |
| 3,682,455 | 8/1972 | Baker | 266/56 |
| 3,700,223 | 10/1972 | Elliott | 266/55 |
| 3,819,163 | 6/1974 | Stunkard | 266/56 |
| 3,910,480 | 10/1975 | Thatcher | 266/55 |
| 4,021,025 | 5/1977 | Frame | 266/58 |
| 4,137,125 | 1/1979 | Walters | 266/64 |
| 4,260,869 | 4/1981 | Slavens et al. | 266/56 |

OTHER PUBLICATIONS

The American Heritage Dictionary of the English Language, Houghton Mifflin Co. Boston, 1969 pp. 580 and 603.

*Primary Examiner*—John P. Sheehan

[57] ABSTRACT

A flexible guide bar for a cutting torch and the like having magnetic means for engaging the piece to be cut and also having adjustable means for engaging metal pipe. Stiffeners may be utilized to assist the guide bar when used to guide the cut of flat stock and edge keepers may be utilized to assist a variation of the guide bar when it is used with flat stock.

4 Claims, 10 Drawing Figures

GUIDE BAR FOR CUTTING TORCH

BACKGROUND OF THE INVENTION

This application is a continuation-in-part application of the parent application Ser. No. 120,713 filed Feb. 11, 1980 abandoned.

This invention relates generally to a guide bar for an oxyacetylene cutting torch and more specifically to a flexible guide bar which may be used to cut flat and pipe stock.

Large diameter gas and oil pipe lines laid over a distance are usually constructed of interconnected sections of metal pipe. The pipe sections are laid end to end and the abutting ends are welded together. In order to assure a tight weld, capable of containing fluids under high pumping pressure, the abutting circumferential ends of the pipe are cut at a conical bevel prior to the welding operation. To cut this bevel with a hand held cutting torch without a guide is extremely difficult if not impossible.

A magnetically supported guide bar supported by magnets is disclosed in the U.S. Patent No. to Angle, No. 2,813,710. However, the bar is not flexible and therefore a different bar must be utilized for arcutate and straight cuts. Furthermore, the shape and rigidity of the guide bars made them difficult to store and carry when the operator is in the field.

SUMMARY OF THE INVENTION

This invention is directed at a flexible guide bar for a cutting torch or the like. The base portion of the guide bar includes a series of through apertures and a locking means. The through apertures in one form of the invention comprise a spaced series along each side edge and a spaced series along the longitudinal midline which includes circular grommets which are longitudinally moveable and which engage the locking means, when the guide is used for a circumferential cut on a pipe or the like. A portion of the locking means may be an externally threaded stud.

A two piece variation of the flexible guide bar having the two pieces connected by a spring or springs may be utilized, if desired. In the variant, the stud is positioned on the smaller, narrower second part or piece and the midline apertures do not include moveable grommets. Edge keepers are used with the variant for engagement with a flat piece of stock.

BRIEF DESCRIPTION OF THE DRAWINGS

Further details are explained below with the help of the examples illustrated in the attached drawings in which.

DESCRIPTION OF THE PREFERRED EMBODIMENTS

Figure 1:
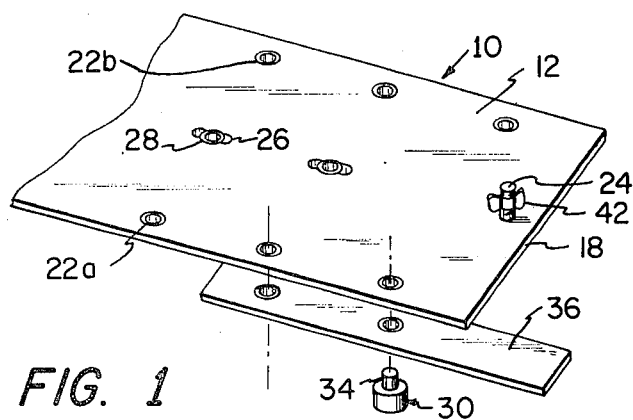
FIG. 1 is a perspective of the guide bar according to the present invention with the base portion broken off.

Referring to the drawings and more specifically to FIGS. 1-4, I have therein illustrated my guide bar 10 for an oxyacetylene cutting torch or the like. The guide bar 10, which may be 4 inches wide and 4 feet long, comprises a flexible base portion 12 having a first long edge 14, a second long edge 16 spaced from and in parallel relation to the first long edge 14, a first terminal end 18 and a second terminal end 20. The first and second terminal ends 18, 20 are spaced from each other and each of them connects the first and second long edges 14, 16. A series of grommeted through apertures 22a are provided in close proximity to the first long edge 14; for example, ¾" from the first long edge 14 on center. A second series of grommeted through apertures 22b are provided in close proximity to the second long edge 16; for example, ¾" from the second long edge 16 on center. Both the series of apertures 22a and 22b has the individual apertures spaced from the others and has the apertures in horizontal alignment defining a line in parallel relation to the first and second long edges 14, 16. A stud 24 extends upwardly from the upper surface of the base portion 12 in right angle relation thereto. The stud 24 is slightly spaced from the first terminal end 18, is positioned on the longitudinal midline of the base portion 12 and is externally threaded for the major portion of its length. The base portion 12 may be formed of asbestos or a fluorocarbon.

A series of elongated oval slots 26 are positioned along the longitudinal midline of the base portion 12 that is 2" from the first long edge 14 on center, are spaced from the stud 24, spaced from each other and have their long axis substantially coincident with the longitudinal midline of the base portion 12. A circular metal or plastic moveable and/or adjustable grommet 28 is fitted into each slot 26 with the O.D. of the body of the grommet slightly smaller than the short axis of the slot 26. The upper flange of the grommet 28 is engaged on one side of the base portion 12 and the lower flange engages the other side of the base portion 12 adjacent to slot 26 thereby preventing the grommet 28 from falling from the slot 26. The stud 24 and grommet 28 provide a locking means. Due to this relationship, the grommet 28 is moveable along a portion of the long axis of the slot 26. Positioning the base portion 12 away from the piece to be cut is accomplished by a group of spacer elements 30. The spacer elements 30 each comprise a cylindrical base element 32 having a metal, tubular post 34, such as aluminum, extending axially therefrom. The base element 32 is formed of magnetized material, such as ALNICO, has a height of ¾" and has a diameter of ¾" while the diameter of the post 34 is approximately ¼". These dimensions may be varied, if desired. The post 34 may be formed of plastic as well as metal.

In order to support the guide bar 10 when it is used to assist in the cutting of a flat piece of stock, extensions or stiffeners 36 are utilized. The stiffeners 36 are formed of a rigid material such as aluminum and each has the configuration of a rectangular strip. The stiffeners 36 each have a width of approximately 1¼" and a length of 6". A series of circular through openings 38 are spaced from each other and are positioned along the longitudinal midline of each stiffener 36. The distance between the center of two adjacent openings 38 is equal to the distance from the center of one aperture 22a to an adjacent aperture 22a.

A guide bar 10 is engaged to a metal pipe 40 by first positioning the spacers 30 on the base portion 12. This is accomplished by passing the post 34 of a spacer 30 through one of the apertures 22a, 22b extending it toward the same horizontal plane as that towards which the stud 24 is extended with the surface of the base element 32 adjacent the post 34 butted against the under surface of the base portion 12. A spacer 30 is thus engaged to each aperture 22a, 22b for the length of the base portion 12 which is approximately equal to the circumference of the pipe 40. The posts 34 are press-fitted into the apertures 22a, 22b. The assembly of the guide bar 10 and the spacers 30 is wrapped around the pipe 40 with the magnetic base elements 32 butted against the external surface of the pipe 40 and the stud 24 passed through a grommet 28. The moveability of the grommet 28 within the slot 26 assures that the guide bar 10 will tightly fit around the pipe 40. This adjustability is brought about through movement of the grommet 28 away from the first terminal end 18 if the circumferential length of the pipe 40 is slightly greater than the distance between the stud 24 and the center point of the involved slot 26. Once the position of the stud 24 and its engaged grommet 28 is fixed in relation to the slot 26 within which they are involved, a wing nut 42 is rotated onto the external threads of the stud 24 locking the stud 24 and the engaged grommet 28 together. Since the first long edge 14 of the base portion 12 was positioned in close proximity to the line to be cut on the pipe 40, the operator of an oxyacetylene cutting torch, for example, can slide the cutting nozzle of the torch along the first long edge 14 to provide an even cut on the pipe 40. The axis of the nozzle of the cutting torch may be positioned at right angle to the horizontal plane of the base portion 12 or may be at any appropriate angle desired by the operator as long as the angle of the nozzle does not cause it to strike the posts 34.

Figure 2:
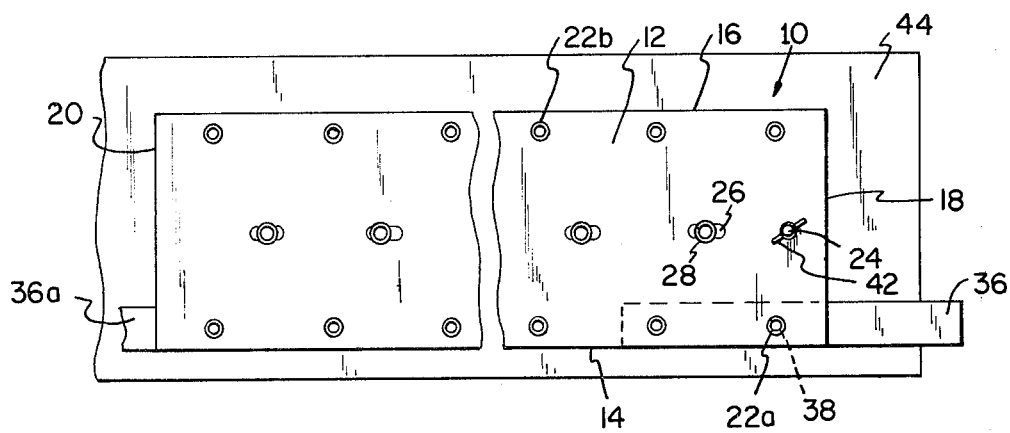
FIG. 2 is a plan view of the guide bar shown in FIG. 1 engaged to a flat piece of stock with the stock and one extender broken off.
Figure 3:
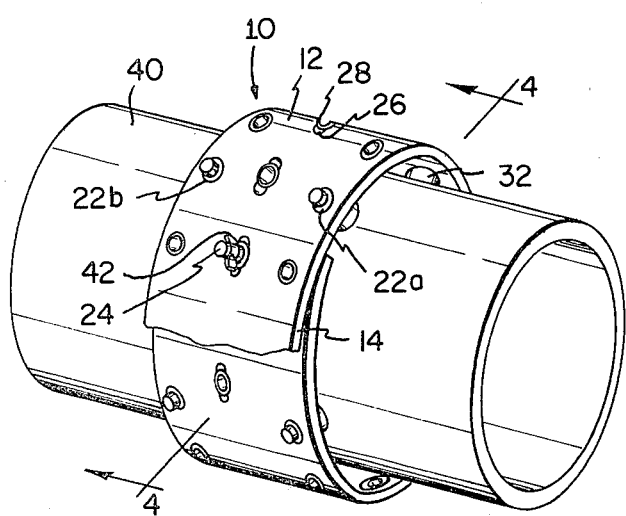
FIG. 3 is a perspective of the guide bar shown in FIG. 1 engaged to a metal pipe with the base portion broken off.
Figure 4:
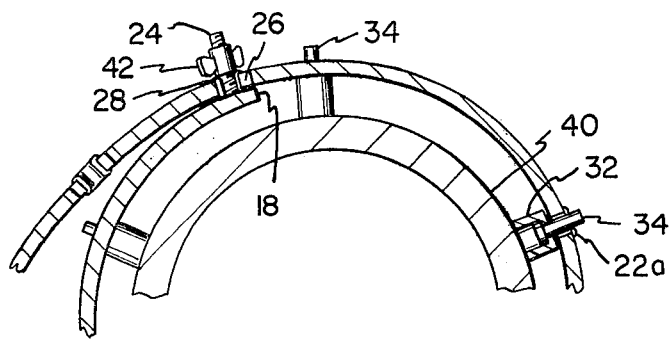
FIG. 4 is a cross section taken on lines 4—4 of FIG. 3.

When the guide bar 10 is used to assist in cutting flat metal stock 44, the stiffeners 36 are attached to the base portion 12 prior to engagement with the stock 44. Some of the openings 38 of the first stiffener are coaxially aligned with the apertures 22a with a portion extending beyond the first terminal end 18 of the base portion 12. The first long edge 14 is positioned on the same vertical plane as the long edge of the stiffener 36 as shown in FIG. 2. A second stiffener 36a is aligned with the base portion 12 in the same manner as the first stiffener 36 except that a portion of the second stiffener extends beyond the second terminal end 20. Where the dimensions of the stock 44 is not great enough to permit engagement of the full length of the base portion 12, the stiffeners need not be extended beyond the base portion 12, or in some cases, only a single stiffener 36 may be used.

Figure 5:
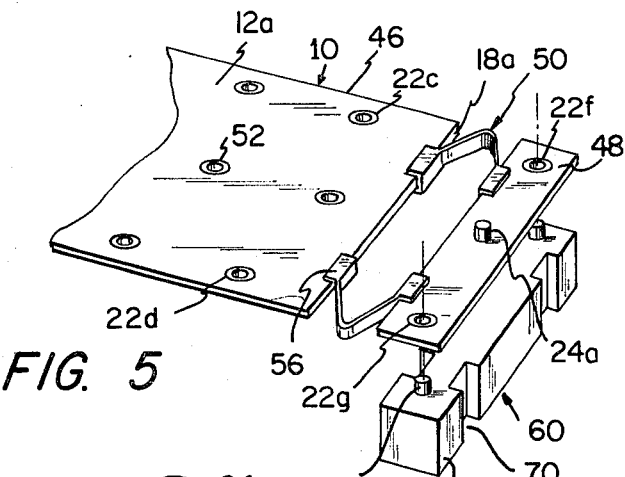
FIG. 5 is a perspective view of a variation of the guide bar shown in FIG. 1 with the first part of the base portion broken off.
Figure 6:
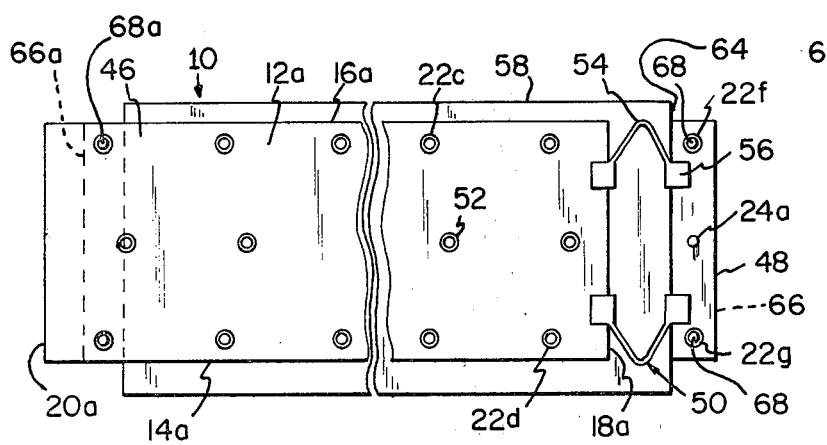
FIG. 6 is a top plan view of the variant guide bar shown in FIG. 5 engaged to a piece of flat stock.

A variation 10a of the guide bar 10 is disclosed in FIGS. 5-10 and comprises a base portion 12a including a first part 46 and a second part 48. The first part 46 is similar in most respects to the base portion 12 having first and second long edges 14a, 16a, first and second terminal ends 18a, 20a and apertures 22d, 22e, all of similar configuration, purpose and position as the respective parts of the base portion 12, except it does not have a stud extending therefrom nor does it have grommets moveable in slots. The first terminal end 18a is attached to an end of the second part 48 through springs 50. The second part 48 has a stud 24a extending from its upper surface, positioned on the midline of the second part 48 and has a through aperture 22f formed adjacent one edge and another through aperture 22g formed adjacent the other edge. The first part 46 has a series of grommeted through holes 52 formed at intervals along its longitudinal midline in place of the slots 26 provided in the base portion 12. The stud 24a and the holes 52 form a locking means. The springs 50 each comprise a flat spring which is formed into a substantially sharp arcuate body portion 54 and an attachment portion 56 integral with and extending from each end of the body portion 54. Each of the attachment portions 56 comprises a channel shaped clamp which includes a first horizontal flat and a second horizontal flat connected at a side edge to each other by a generally U shaped end portion. The first and second horizontal flats are in parallel relation to each other. One of the attachment portions 56 is clamped to the terminal end of the first part 46 of the base portion 12a and the other attachment portion 56 is clamped to the second part 48 as shown in FIGS. 5 and 6.

As was the case with the base portion 12, the base portion 12a is positioned in spaced relation to a piece to be cut by a series of spacer elements 30a. The spacer elements 30a are similar to the spacer elements 30 and each comprise a cylindrical base element 32a, formed of a magnetic material, and having a metal, tubular post 34a extending axially therefrom. The dimensions of the spacer element 30a is the same as spacer element 30 and may also be varied if desired. Obviously, the post 34a may be formed of plastic.

The guide bar 10a is engaged to a metal pipe 40a by first engaging the spacer element 30a to the apertures 22d and 22e in the same manner as the spacer elements 30 are engaged to the apertures 22a and 22b as explained hereinbefore. The assembly of the guide bar 10a and the spacers 30a is wrapped around the pipe 40a with the magnetic base elements 32a butted against the external surface of the pipe 40a, the stud 24a passed through a hole 52 and the lower surface of the first part 46 of the base portion 12a in superposed relation to the upper surface of the second part 48. If the vertical axis of the post 24a needs to be moved away from the terminal end 20a of the first part 46 in order to engage a hole 52, the spring body portion 54 will permit the second part 48 to be moved from the first part 46 allowing tensioned variable engagement for different diameter pipes.

When the guide bar variation 10a is to assist in cutting flat metal stock 58, first and second edge keepers 60, 62 are utilized. The variation 10a is positioned in relation to an edge 64 of the stock 58 with the spacers 30a abutting in superposed relation to the upper surface of the stock 58 and with the edge of the second part 48 that is engaged by the attachment portions 50 lying in close proximity to the same vertical plane as the edge 64. The first edge keeper 60 comprises a rectangular base 66 having an upper surface with a cylindrical post element 68 positioned on and extending upwardly from the midline of the base 66 adjacent each side edge. The base 66 has the same width and length as the second part 48 of the guide bar 10a. The post elements 68 are positioned to be engaged through apertures 22f, 22g butting the upper surface of the base 66 against the lower surface of the second part 48.

Figure 9:
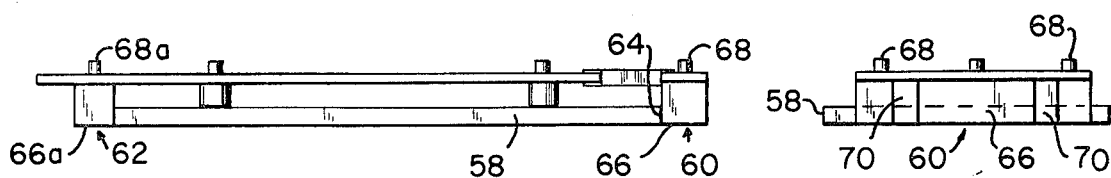
FIG. 9 is a side elevational view of the variant guide bar and piece of flat stock shown in FIG. 6.
Figure 10:
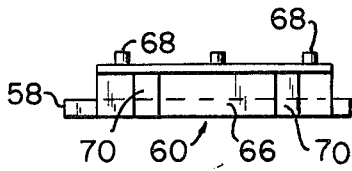
FIG. 10 is an end elevational view of the variant guide bar and piece of flat stock shown in FIG. 6.
Figure 7:
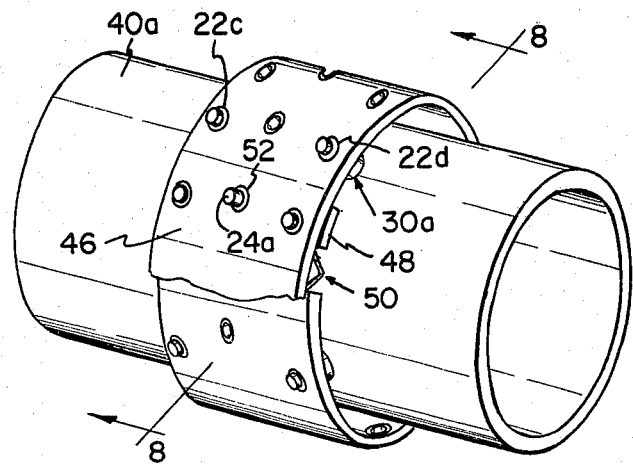
FIG. 7 is a perspective view of the variant guide bar shown in FIG. 5 engaged to a metal pipe with the first part of the base portion broken off.
Figure 8:
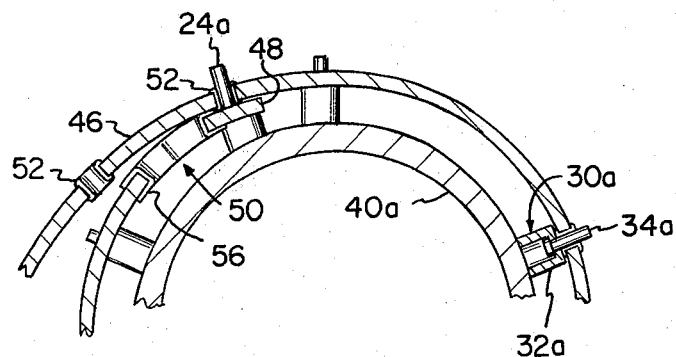
FIG. 8 is a cross sectional view taken on lines 8—8 of FIG. 7.

Relief slots 70 are formed on the forward and rear edges of the edge keepers 60, 62 and positioned to encompass the areas on the lower surface where the attachment portions 56 of the springs 50 engage the second part 48. The base 66 has a thickness which is slightly greater than the height of the base element 32a of the spacer 30a. The second edge keeper 62 is similar in all respects to the first edge keeper 60 including a rectangular base 66a having post elements 68a extending upwardly therefrom and adapted to be engaged through the apertures 22c, 22d. When the first edge keeper 60 is in position butted against the lower surface of the second part 48 with the post elements 68 engaged through the apertures 22f, 22g, the lower portion of the forward edge of the first edge keeper 60 will bear against the edge 64 of the stock 58 as shown in FIGS. 6 and 9. Since the stock 58 is shorter than the length of the guide bar variation 10a, pull may be applied to the variation 10a tensioning the body portion 54 of the spring 50 and permitting engagement of the second edge keeper 62. Engagement of the second edge keeper 62 is accomplished by having its forward edge bear against the edge of the stock 58 parallel with the edge 60, its upper surface butted against the lower surface of the first part 46 and having the post elements 68a engaged through the apertures 22c, 22d as shown in FIGS. 6 and 9.

What I claim is:

1. A guide bar for a cutting torch, the guide bar comprising a flexible base portion and a locking means, the base portion having a first terminal end, a second terminal end, a horizontal plane, a first long edge having a guide element extending therefrom and a series of apertures and least one slot, the apertures and slot having vertical axis formed in right angle relation to the horizontal plane, the locking means including a first fastener element and a moveable grommet fitted into the slot, the moveable grommet engaged to the base portion and the first fastener element comprising an externally threaded stud attached to the base portion in close proximity to the first terminal end, the base portion having at least two spacer elements engaged thereto, the spacer elements spaced from each other and each of them including a magnet.

2. A guide bar as set forth in claim 1 further comprising a stiffener adapter, the base portion having an upper surface, a lower surface, and a second long edge, the stiffener adapter attached to the lower surface in close proximity to the second long edge.

3. A guide bar as set forth in claim 1 wherein the base portion comprises a first part and a second part attached together by a spring means.

4. A guide bar as set forth in claim 3 wherein the second part has an upper surface, the upper surface having a stud extending therefrom.

* * * * *